(No Model.)
J. M. HART.
ICE CREAM FREEZER.
No. 491,104.  Patented Feb. 7, 1893.
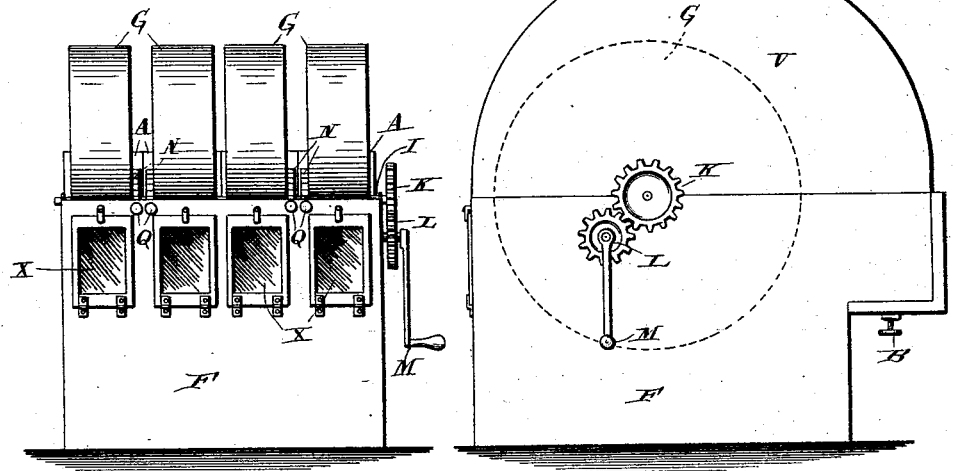
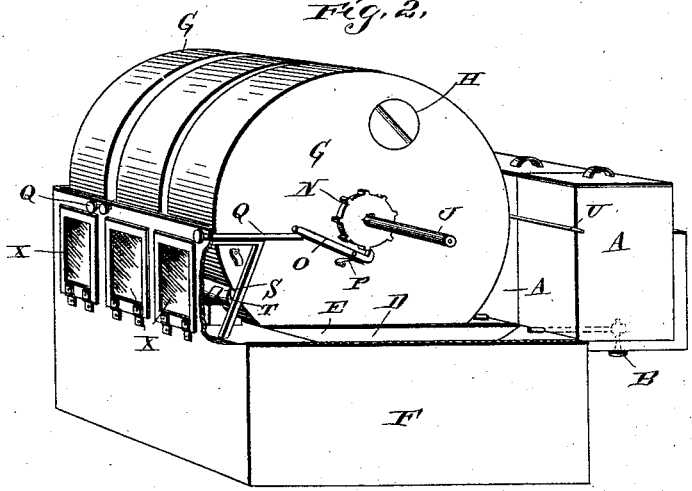
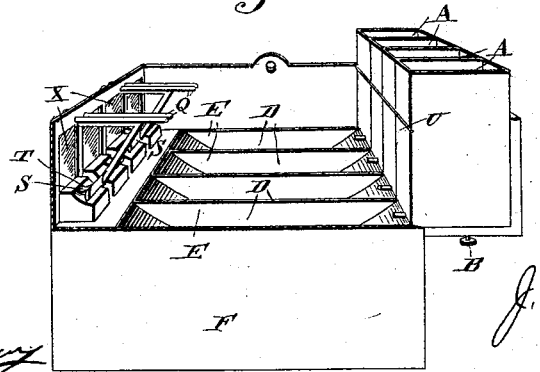
Witnesses:
J. H. Taylor
Wm. Harvey
Inventor:
J. M. Hart

UNITED STATES PATENT OFFICE.

JAMES M. HART, OF TOPEKA, KANSAS.

ICE-CREAM FREEZER.

SPECIFICATION forming part of Letters Patent No. 491,104, dated February 7, 1893.

Application filed June 18, 1892. Serial No. 437,221. (No model.)

*To all whom it may concern:*

Be it known that I, JAMES M. HART, a citizen of the United States, residing at Topeka, in the county of Shawnee and State of Kansas, have invented a new and useful Improvement in Ice-Cream Freezers, of which the following is a specification.

My invention relates to improvements in ice cream freezers which freeze the cream upon the outside of a rotary cylinder and the objects of my invention are First. To provide a machine for freezing ice cream by which the flow of the cream to be frozen can be regulated so that no more cream can be frozen at any time than desired, and it can be frozen as fast as desired, and the quantity of the cream manufactured can be regulated at will by the operator. Second. To provide a machine by which at the same time several kinds and varieties of ice cream can be made at once and kept separate.

In the accompanying drawings in which similar letters of reference indicate like parts, Figure 1 is a front view of the machine built with the four revolving drums, with the top removed. Fig. 2 is a perspective view of the machine with the top and end and one drum removed. Fig. 3 is a perspective view of the mechanism inside of the freezer, showing the scrapers and the sliding bolts, and the place for receiving the cups and vessels containing fluid to be frozen, and the separate cream pans. Fig. 4 shows the machine covered, complete, ready for use.

A represents a vessel for cream, there being one of these vessels for each drum. This vessel A is preferably a rectangular shaped box, open at the top, with a lid, having in the center of the bottom a stop cock, one orifice of said stop cock in said vessel and the other projecting over the cream pan under the drum, with the handle below the vessel convenient for the operator.

B is a stop cock attachment in vessel A, for the purpose of adjusting and regulating the flow of fluid into the cream pan to be frozen.

D is a cream pan, being a curved, metal pan, constructed above the bottom of the refrigerator box, the lowest point of the curve being about four inches from the bottom of the box, and following in its curve of the drums, just permitting the drum to revolve without being obstructed as it is turned. It is rigidly secured to one side of the box in which the machine is constructed, and rigidly secured at each end of the same; and also supported and strengthened by divisions E, there being one of each division between each of the drums, so as to make each cream pan separate from the other. This cream pan is to receive the fluid to be frozen, and as fast as it is allowed to enter the cream pan it is taken up by the revolving drum.

F is a rectangular shaped refrigerator box having a small offset along one side near the corner of the base. This refrigerator box is lined with metal throughout, and is in two sections; the top and bottom. At each end of the bottom section, near the center of the upper edge, are suitable journal bearings, so as to engage and hold securely an axle upon which the drums revolve. The bottom of this refrigerator box beneath the cream pan can be also packed with ice or freezing mixture, there being a space between the cream pan and the bottom of the refrigerator box and a space in front of about three inches to allow the operator to pack the same.

G is a drum of metal, being a cylindrical shaped box made water-tight, for the purpose of holding the ice or freezing mixture, having a hand-opening at H, for the purpose of inserting or removing ice or freezing mixture, and having also through the center an orifice for an axle, there being as many drums as desired, so that each drum may freeze a separate kind of cream.

H is a cap screw covering the opening in the one side of the drum G, where the freezing mixture is packed in the drum so that when the cap H is screwed into its place the outside of the same is flush with the surface of the drum G, and presents no obstacle to its free revolution.

I is a hub bearing, being a pipe securely and rigidly fastened in the center of drum G, on the inside of the drum extending through the drum with water-tight joint; and this turns loosely upon axle J.

J is an axle, being a continuous shaft running through the center of all the drums, and playing loosely therein, working in journal bearings at each end of refrigerator box F, and operated by a cog wheel K rigidly secured to the end of said axle, working in cog wheel L journaled on the end of refrigerator box F, which cog wheel L is turned by crank M and handle.

K is a cog wheel rigidly secured to the end of the axle, on the outside of the refrigerator box. On this axle, alongside of each of the drums, is rigidly secured to the axle a ratchet wheel N. These ratchets are rigidly secured by means of keys, or other suitable means, so that it can be taken off when it is desired to remove the axle from out of all the cylinders.

It will be noticed in the drawings that the second and third drums are closer together than either the first and second or third and fourth. For convenience the ratchet wheels are placed between the first and second and third and fourth, making the bolts or slides which operate and work upon the ratchet wheels close together; and also when the drums are all removed from the refrigerator box, the two outside cylinders can be removed from the axle, and then the other inside cylinders can be filled or cleansed without their being taken off the axle.

O is a pawl pivoted to the side of each drum G, one end of which engages the ratchet N, and is kept pressed on the ratchet by a small spring P playing upon the head of the pawl.

Q is a sliding bolt adapted to engage lever arm of the pawl O and throw the pawl away from the ratchet by slight pressure.

R is a small spring, one end of which is rigidly secured to side of drum G, near the rim thereof, and the other end projects from drum G; and as the drum revolves spring R passes the bolt Q, and prevents a reverse motion of drum G. It always acts as a dog to prevent reverse motion of the drum and always engages bolt Q without regard to whether bolt Q is in or out.

S is a scraper, loosely hinged at the bottom so that it may be turned on the periphery of drum G, scraping the frozen cream off of the surface of drum G as it is revolved, and allowing it to drop into any suitable receptacle placed directly under it, or into suitable vessels connected therewith, there being a separate scraper hinged in front of each drum.

T is a spring, being an ordinary wire coil, one end of which holds the scraper S in proper position against the drum, this spring T is secured inside of the refrigerator box by any suitable connection.

U is a small wire running the length of the box, holding vessels A in place, and preventing contact with drums.

V is a top covering for the refrigerator box F, making the upper section of said refrigerator box, which top covering is metal lined. This covering is box like in form and follows closely in its outline the form of the cylinders. This cover is water-tight and has a suitable opening at the top so as to permit ice or freezing material to be inserted, and forms a packing chamber above the drums suitable to contain freezing material, about four inches thick. This cover neatly incloses and securely covers the drums and the vessels containing cream.

W is the opening for the cover, through which the ice is inserted.

X is a small glass door hinged at the bottom, and caught with snap bolt at the top, suitable for a small vessel to be inserted through this door, through this glass door the operation and working of the freezing process can be easily seen; and when desired the door can be opened and a small vessel inserted under each of the scrapers, on the drum, so as to receive the frozen cream as it is scraped off.

To describe the operation of my invention:— The base of the refrigerator box, below the cream pan D, is packed with ice; the cover is removed and well packed with freezing material. The drums G are each of them packed with freezing material, through the opening H, which opening is carefully closed to prevent any leakage. The four drums are placed upon the axle loosely, and the axle is secured in its journal bearings at each end of the box. Into each one of the vessels A is poured fluid desired to be frozen, with the various flavoring extracts mixed therein, the cover is then placed over the cylinders, and the machine is ready for use. When any kind of ice cream is desired, the sliding bolt Q is drawn out from the box opposite to that cylinder that it is desired to operate, and to produce the required cream. This slide is drawn out sufficiently far to release the pawl O, which by reason of spring P engages the ratchet N, securely locking itself therein. As the handle M is turned motion is imparted to the cog wheels L and K, and to the axle J. The ratchet wheel N turns with the axle, being rigidly secured thereon, and holding secure the pawl, carries with it that drum. The stop cock B is turned, underneath the vessel containing the cream, opposite to that cylinder which is desired to be operated, permitting the cream to run down into the cream pan D. As the handle M is turned toward the right the cylinder G slowly revolves toward the left, with a reverse motion. The cream dropping into pan D, is instantly taken up by the revolving drum on its periphery, freezing as it revolves, until, by the time that it has reached the scraper S, it is well frozen and ready to be removed. As it reaches the point where scraper S strikes the drum, it is removed by the scraping process, and passes into a vessel there placed to receive it. When sufficient quantity of this kind of cream has been produced the sliding bolt Q is pushed in, engaging the lever on pawl O, throwing the pawl out from the ratchet N; and at the same time spring R, acting as a dog engages the bolt Q preventing reverse motion of the drum; and the axle may be turned without any effect being produced on that cylinder; and it remains stationary until the pawl is released by the operation of the sliding bolt, and the handle is turned, and the pawl is again permitted to engage the ratchet. It will thus be seen that any one of the drums can be operated alone, or in conjunction with any one or with all of the drums, at the same time; so that any one, or two, or three, or four of the different varieties used, or as many varieties as there may be cylinders and vessels can be manufactured at the same time. I know that it is not new to freeze a mixture on the rim of a drum and remove the same by scraping it therefrom; but the difference between my invention and advantages over all others known to me is that in my invention no more cream or fluid can flow to the cream pan than is desired or can be taken up by the revolving drum; and by the regulation of the flow the drum will not freeze a large mass solid in the cream pan; for unless the flow was regulated the whole would freeze solid and prevent the drum from revolving. Then again with my invention the variety desired at the time by the buyer can be furnished, or several varieties can be produced by the same turn of the axle at the same time; and only such drums need be turned as it is desired to operate.

Having thus fully described my invention what I desire to secure by Letters Patent and claim is:

1. In an ice cream freezer a refrigerator box having a circular shaped space inside and a series of cream pans in the bottom and a series of cream vessels arranged in one side each vessel having stop cock connection with its separate cream pan in combination with a series of drums mounted on the same axle in the circular space in the refrigerator having ratchets on the axle adapted to revolve one or more or all of said drums at the same time, a hinged scraper in front of each drum, a handle with cog wheels to turn the axle, and a series of bolts to disengage the ratchets from the drums, all substantially as described.

2. In an ice cream freezer a refrigerator box having a circular shaped space inside and a series of cream pans in the bottom and a series of cream vessels arranged in one side each vessel having stop cock connection with its separate cream pan in combination with a series of drums mounted on the same axle in the circular space in the refrigerator having ratchets on the axle adapted to revolve one or more or all of said drums at the same time, a hinged scraper in front of each drum, a handle with cog wheels to turn the axle, a series of bolts to disengage the ratchets from the drums, and a spring secured to each drum acting as a dog to prevent reverse motion, all substantially as described.

JAMES M. HART.

Witnesses:
WILLIAM HARVEY,
ORION M. DAVIS.